US011395971B2

(12) United States Patent
Valencia

(10) Patent No.: US 11,395,971 B2
(45) Date of Patent: Jul. 26, 2022

(54) AUTO HARASSMENT MONITORING SYSTEM

(71) Applicant: Sony Interactive Entertainment LLC, San Mateo, CA (US)

(72) Inventor: Vanessa Valencia, Hayward, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 11 days.

(21) Appl. No.: 16/924,173

(22) Filed: Jul. 8, 2020

(65) Prior Publication Data

US 2022/0008830 A1    Jan. 13, 2022

(51) Int. Cl.

| | |
|---|---|
| *A63F 13/75* | (2014.01) |
| *A63F 13/79* | (2014.01) |
| *A63F 13/35* | (2014.01) |
| *G06N 20/00* | (2019.01) |
| *G06N 5/04* | (2006.01) |

(52) U.S. Cl.
CPC .............. *A63F 13/75* (2014.09); *A63F 13/79* (2014.09); *A63F 13/35* (2014.09); *A63F 2300/5546* (2013.01); *A63F 2300/5586* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2009/0174702 A1* | 7/2009 | Garbow | A63F 13/75 |
| | | | 345/419 |
| 2010/0105484 A1* | 4/2010 | Horneff | A63F 13/12 |
| | | | 463/43 |
| 2019/0270021 A1* | 9/2019 | Hume | A63F 13/79 |
| 2020/0078688 A1 | 3/2020 | Kaethler et al. | |
| 2020/0129864 A1 | 4/2020 | Tran et al. | |
| 2020/0272283 A1* | 8/2020 | Sarin | G06F 3/167 |
| 2021/0154587 A1 | 5/2021 | Kaethler et al. | |

OTHER PUBLICATIONS

PCT/US2021/038315, Notification of Transmittal of the International Search Report and the Written Opinion of the International Searching Authority, or the Declaration, PCT/ISA/220, and the International Search Report, PCT/ISA/210, dated Sep. 23, 2021.

* cited by examiner

*Primary Examiner* — Jason T Yen
(74) *Attorney, Agent, or Firm* — Penilla IP, APC

(57) ABSTRACT

Methods, systems, and computer programs are provided for identifying an abusive player in a game. One method includes receiving gameplay data for a player during gameplay of the game. The method includes processing a plurality of game mechanics of the game as the player provides input for one or more of said plurality of game mechanics. The method includes processing abusive action scores for each of the plurality of game mechanics. The abusive action scores have a number of tagged actions that are inconsistent with predefined use of said plurality of game mechanics based a game context of the gameplay of the game. The method includes qualifying the player as abusive in regard to one or more of the plurality of game mechanics based on one or more of the abusive actions scores exceeding a threshold during a session of the gameplay of the game.

18 Claims, 10 Drawing Sheets

Game Mechanics Grid: Game N, Player N

| Game Mechanics ID | Description | Abusive Actions | | | | Complaints | Abusive Action Score | Threshold | Threshold Exceeded? |
|---|---|---|---|---|---|---|---|---|---|
| | | Fail Intentionally | Misuse | Overuse | Spamming | | | | |
| GM-1 | Points scored | 0 | 1 | 0 | 0 | 0 | 0.2 | 0.5 | No |
| GM-2 | Prisoner rescued | 2 | 0 | 4 | 2 | 3 | 2.2 | 2.0 | Yes |
| GM-3 | Obstacle course completed | 1 | 0 | 0 | 0 | 1 | 0.4 | 0.5 | No |
| GM-4 | Relay race completed | 0 | 0 | 0 | 0 | 0 | 0.0 | 0.5 | No |
| GM-5 | Puzzle solved | 0 | 0 | 0 | 0 | 0 | 0.0 | 1.0 | No |
| GM-6 | Badges obtained | 1 | 1 | 1 | 0 | 1 | 0.8 | 2.0 | No |
| GM-7 | Defense against enemies | 4 | 0 | 2 | 0 | 0 | 1.2 | 0.8 | Yes |
| GM-8 | Enemies Attacked | 6 | 0 | 0 | 0 | 5 | 2.2 | 2.0 | Yes |
| GM-9 | Damage acquired | 2 | 1 | 0 | 0 | 2 | 1.0 | 1.5 | No |
| | | | | | | | | | |
| GM-N | Weapons acquired | 2 | 0 | 0 | 2 | 2 | 1.2 | 1.0 | Yes |

Fig. 4A

Player Accolades Table

| Player | Action Scene | Accolades Given | Average Accolades | Abusive Action? |
|---|---|---|---|---|
| Player 1 | Boss Fight | ↑↑ | 3.5/5 | No |
| | Ninja Fight in Field | ↑ | 2/5 | No |
| | Rescue Mission | ↑↑↑ | 4.5/5 | No |
| | Battling Poseidon | ↑ | 1.5/5 | No |
| | Climbing Ladder | →→↓ | -3.5/5 | Yes |
| Player 2 | Boss Fight | ↑↑↑ | 4.5/5 | No |
| | Ninja Fight in Field | →↑ | 2/5 | No |
| | Rescue Mission | →→↓ | -3/5 | Yes |
| | Battling Poseidon | ↑↑↑ | 4/5 | No |
| | Climbing Ladder | ↑↑↑ | 4.5/5 | No |
| Player n | ... | ... | ... | ... |

Fig. 6

AUTO HARASSMENT MONITORING SYSTEM

BACKGROUND

1. Field of the Disclosure

The present disclosure relates generally to dynamic monitoring gameplay of a player, and more particularly to methods and systems for identifying whether a player is an abusive player.

2. Description of the Related Art

The video game industry has seen many changes over the years and has been trying to find ways to enhance a player's gaming experience so that engagement by the player is increased or maintain. An increase in a player's engagement level in video games can result in higher retention levels and an increase video game revenue. To this end, developers have been seeking ways to develop sophisticated operations to enhance a player's gaming experience.

A growing trend in video game industry is online harassment and cyberbullying in video games by players commonly referred to as abusive players, bad faith players, or griefers. For example, an abusive player can be a player in a multiplayer video game who deliberately irritates, annoys, and harasses other players within the game, using aspects of the game in unintended ways. Accordingly, this prevents other players (e.g., good faith players) from becoming fully immersed in their gameplay and from fully enjoying their gaming experience. Unfortunately, identifying abusive players and monitoring their actions in the gameplay may be difficult and utilize a significant amount of resources. As a result, the actions by abusive players in a gameplay may interfere with the gameplay of other players which may lead to a decrease in player engagement in video games, and in turn lead to players playing video games less frequently.

It is in this context that implementations of the disclosure arise.

SUMMARY

Implementations of the present disclosure include devices, methods and systems relating to identifying abusive players in gameplay from among a plurality of players playing the game. In some embodiments, abusive acts committed by the player are tagged during the gameplay of a player to determine an abusive action score for a corresponding game mechanic In some embodiments, if the abusive action score exceeds a threshold value, the player is identified as an abusive player and remedial measures may be taken to prevent the player from acting abusively in the gameplay. In some embodiments, a warning notification can be generated to notify the player during the gameplay that the player has been identified as an abusive player, or the game mechanics associated with the gameplay of the player can be limited.

In one embodiment, a method for identifying an abusive player in a game is provided. The method includes receiving gameplay data for a player during gameplay of the game. The method includes processing a plurality of game mechanics of the game as the player provides input for one or more of said plurality of game mechanics. The method includes processing abusive action scores for each of the plurality of game mechanics. The abusive action scores have a number of tagged actions that are inconsistent with predefined use of said plurality of game mechanics based a game context of the gameplay of the game. The method includes qualifying the player as abusive in regard to one or more of the plurality of game mechanics based on one or more of the abusive actions scores exceeding a threshold during a session of the gameplay of the game. In some cases, the player may be identified as abusive for specific types of games or for specific types of game mechanics.

In another embodiment, a non-transitory computer-readable storage medium storing a computer program is provided. The computer-readable storage medium includes program instructions for receiving gameplay data for a player during gameplay of the game, and program instructions for processing a plurality of game mechanics of the game as the player provides input for one or more of said plurality of game mechanics. The computer-readable storage medium includes program instructions for processing abusive action scores for each of the plurality of game mechanics. The abusive action scores have a number of tagged actions that are inconsistent with predefined use of said plurality of game mechanics based on a game context of the gameplay of the game. Additionally, the computer-readable storage medium includes program instructions for qualifying the player as abusive in regard to one or more of the plurality of game mechanics based on one or more of the abusive actions scores exceeding a threshold during a session of the gameplay of the game.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 4A illustrates an embodiment of a game mechanics grid for a game played by a player, in accordance with an implementation of the disclosure.

FIG. 6 illustrates an embodiment of a player accolades table for a plurality of players, in accordance with an implementation of the disclosure.

DETAILED DESCRIPTION

Figure 1:
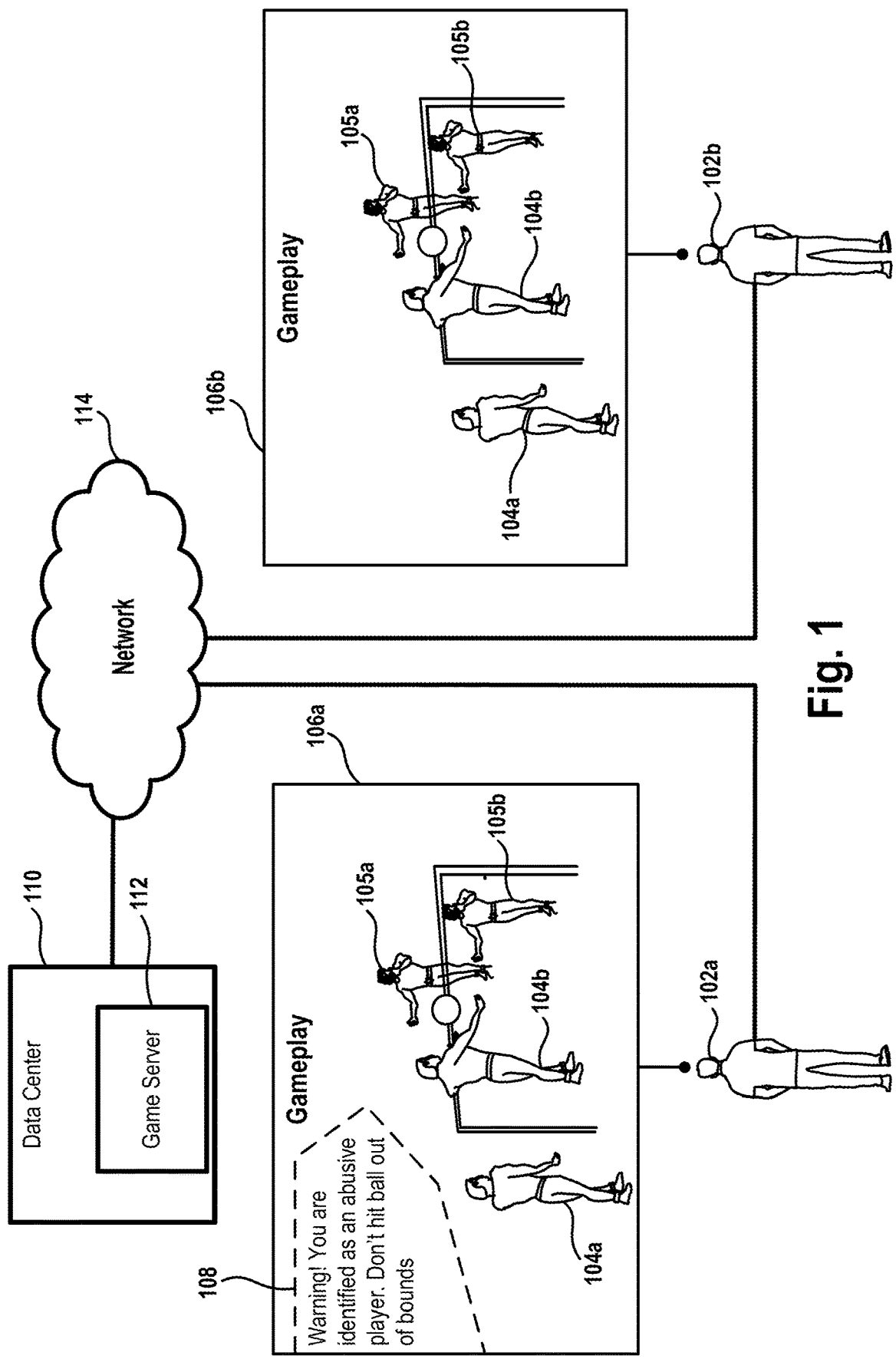
FIG. 1 illustrates an embodiment of a system configured to execute a gameplay for a plurality of players and to send a warning notification to the player that is identified as an abusive player, in accordance with an implementation of the disclosure.

The following implementations of the present disclosure provide devices, methods, and systems for identifying an abusive player in a game during a session. In particular, the present disclosure identifies abusive players from among a plurality of players playing a game by tracking and tagging acts in the gameplay that are characterized as abusive behavior. Once the abusive player is identified, the abusive player is notified via a warning notification and is requested to comply with the warning notification. In other cases, the player may be penalized in a number of ways or game mechanics associated with the gameplay of the player can be limited.

The embodiments described herein can be used to encourage players to refrain from abusive behavior. Abusive behavior can have negative impacts on gaming systems, as more processing power and resources are used up by players that have little to no intent on playing games for enjoyment, but instead act to frustrate other players. By way of example, in online and streaming gaming, servers are used to satisfy bandwidth requirements of all players. Although server and processing resources have improved significantly over the years, supplying processing power and system resources to players who engaging in abusive gameplay activities will unnecessarily increase the strain on resources or increase the power resources required to keep abusive players online. In some cases, the strain on game resources can have performance impacts on other players that play games as intended.

In one embodiment, a method is disclosed that enables identifying an abusive player in a game played by a plurality of players. The method includes receiving gameplay data for a player during gameplay of the game. The method may further include processing a plurality of game mechanics of the game as the player provides input for one or more of said plurality of game mechanics. The method may further include processing abusive action scores for each of the plurality of game mechanics. The abusive action scores have a number of tagged actions that are inconsistent with pre-defined use of said plurality of game mechanics based a game context of the gameplay of the game. The method includes qualifying the player as abusive in regard to one or more of the plurality of game mechanics based on one or more of the abusive actions scores exceeding a threshold during a session of the gameplay of the game. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for identifying an abusive player in a game such as an online multiplayer video game. For example, the game may be a particular game being played live during an E-sports event, group game play, or team play. In one embodiment, the system may include a plurality of players connected over a network. The plurality of players may be playing a multiplayer video game or competing against one another in a live gaming event. In some embodiments, one or more data centers and game servers can execute the game and enable connections to the players when hosting the video game. The one or more game servers of the one or more data centers may be configured to receive, process, and execute data from a plurality of players.

In some embodiments, during the gameplay, abusive players can be identified from among the plurality of players playing the video game. For example, an abusive player may be a player who deliberately irritates and harasses others players in a game, or uses aspects of the game in unintended ways. In one embodiment, a warning notification can be generated to notify the abusive player of their abusive acts during the gameplay. The warning notification may used to put the abusive player on notice that the player has been identified as an abusive player and request the abusive player to comply with the warning notification (e.g., do not kill your teammate, follow your leader, follow the team plan, don't avoid scoring points, do not spam chat channel, do not hit ball out of bounds, etc.).

In accordance with another embodiment, a system is disclosed for identifying an abusive player in a game and generating a warning notification for the player that is identified as abusive player. In one embodiment, the system enables receiving gameplay data for a gameplay of a player. The gameplay data can be processed to identify various game mechanics associated with the gameplay of the player. The features from the game mechanics can be extracted and classified using one or more classifiers. In some embodiments, the classified features can be used by an abuse indicator model to predict whether the actions of the player during the gameplay are characterized as abusive behavior or actions.

In one embodiment, a player profile model can be used to generate a profile associated with a player. In some embodiments, the profile of the player may include the player's gameplay tendencies which can be used by the player profile model to determine whether the actions of a player during a gameplay are characterized as abusive behavior. For example, the player profile model may determine that a player is an expert in sword combat and the player's weapon preference is combat scenes is a sword. When analyzing game mechanics of a player that involves attacking enemies, the abuse indicator model may take into consideration the profile of the player (e.g., sword expert) to determine whether the actions of the player are characterized abusive. In other words, if the player chooses to use a sword rather than a gun to attack an enemy during a gameplay even though the use of a gun would generally be more effective, the abuse indicator model may take into consideration that the player is an expert in sword combat and will not characterize the actions of the player as abusive.

In accordance with another embodiment, accolades (positive or negative) may be given to a player during the gameplay of the player or after a game session ends. A player may give accolades to other players participating in the gameplay, e.g., teammate, player on opposing teams, etc. In some embodiments, a player who has a track record of receiving positive accolades may help distinguish the player as being a good faith player rather than an abusive player. Conversely, a player who has a track record of receiving negative accolades may help distinguish the player as being an abusive player rather than a good faith player. In one embodiment, the player accolades may be used by the abuse indicator model to help predict whether the game mechanics associated with the gameplay of the player are characterized as abusive.

With the above overview in mind, the following provides several example figures to facilitate understanding of the example embodiments.

FIG. 1 illustrates an embodiment of a system configured to execute a gameplay for a plurality of players 102a-102b and to send a warning notification 108 to a player that is identified as an abusive player. In one example, an abusive player may be one that abuses game mechanic or acts inconsistent with advancement in a game. In another example, the abusive player may be abusive toward another player. The abusive behavior may be, for example, intentionally not helping a team player complete a task, taking actions to reduce the game actions of another player, continued interference toward another player, or generally acting inconsistent with intended use of game actions or game mechanics to advance or enjoy a game.

In one embodiment, FIG. 1 illustrates players 102a-102b, a data center 110, a game server 112, and a network 114. Players 102a-102b are coupled to and can communicate with the data center 110 and the game server 112 through the network 114. The system of FIG. 1 may be referred to as a cloud gaming system, where multiple data centers 110 and game servers 112 may work together to provide wide access to users and players 102 in a distributed and seamless fashion.

In some embodiments, the players 102a-102b can be playing a multiplayer game where they are teammates or on opposing teams competing against one another. The players 102a-102b can be configured to send game commands to the data center 110 and the game server 112 through the network 114. In addition, the players 102a-102b can be configured to receive encoded video streams and decode the video streams received by the data center 110 and game server 112. In some embodiments, the video streams may be presented to players 102a-102b on a display and/or a separate device such as a monitor or television. In some embodiments, the devices of the players can be any connected device having a screen and internet connections.

For example, FIG. 1 illustrates an embodiment of players 102a-102b playing a game that is displayed on monitors 106a-106b, respectively. In the game, players 102a-102b are on the same team competing against an opposing team in a volleyball tournament. As shown on the monitors 106a-106b, players 102a-102b are represented by avatars 104a-104b, respectively, which shows them competing against players on the opposing team, e.g., 105a-105b. During the gameplay, the system automatically monitors the game mechanics and various actions occurring in the gameplay and determines whether any of the acts of the players 102a-102b are characterized as abusive.

In some embodiments, the system may identify one or more players in the gameplay as abusive players by determining whether their abusive action score for a particular game mechanic exceeds a threshold value. In some embodiments, the abusive action score is determined based on the total number of abusive acts committed by the player during a game session. In one embodiment, when a player 102 is identified as an abusive player, a warning notification 108 is generated and can appear on the monitor 106 of the player to notify the player that the player has been identified as an abusive player. In some embodiments, the warning notification 108 may include specific instructions requesting the abusive player to comply with a specific request or to restrain from performing abusive acts. For example, as shown in FIG. 1, player 102a is identified as an abusive player. A warning notification 108 my appear on the monitor 106a of the abusive player (e.g., player 102a) notifying the player that the player has been identified as an abusive player. As illustrated, the warning notification 108 includes the message, "Warning! You are identified as an abusive player. Don't hit ball out of bounds." Accordingly, the warning notification 108 may discourage abusive players from playing the game in ways that intentionally interfere with the gameplay of others so that the gameplay is enjoyable to all the players participating in the game. In some embodiments, if the abusive player does not comply with the request in the warning notification, other disciplinary measures may be taken to prevent the player form performing the abusive acts.

Figure 2A:
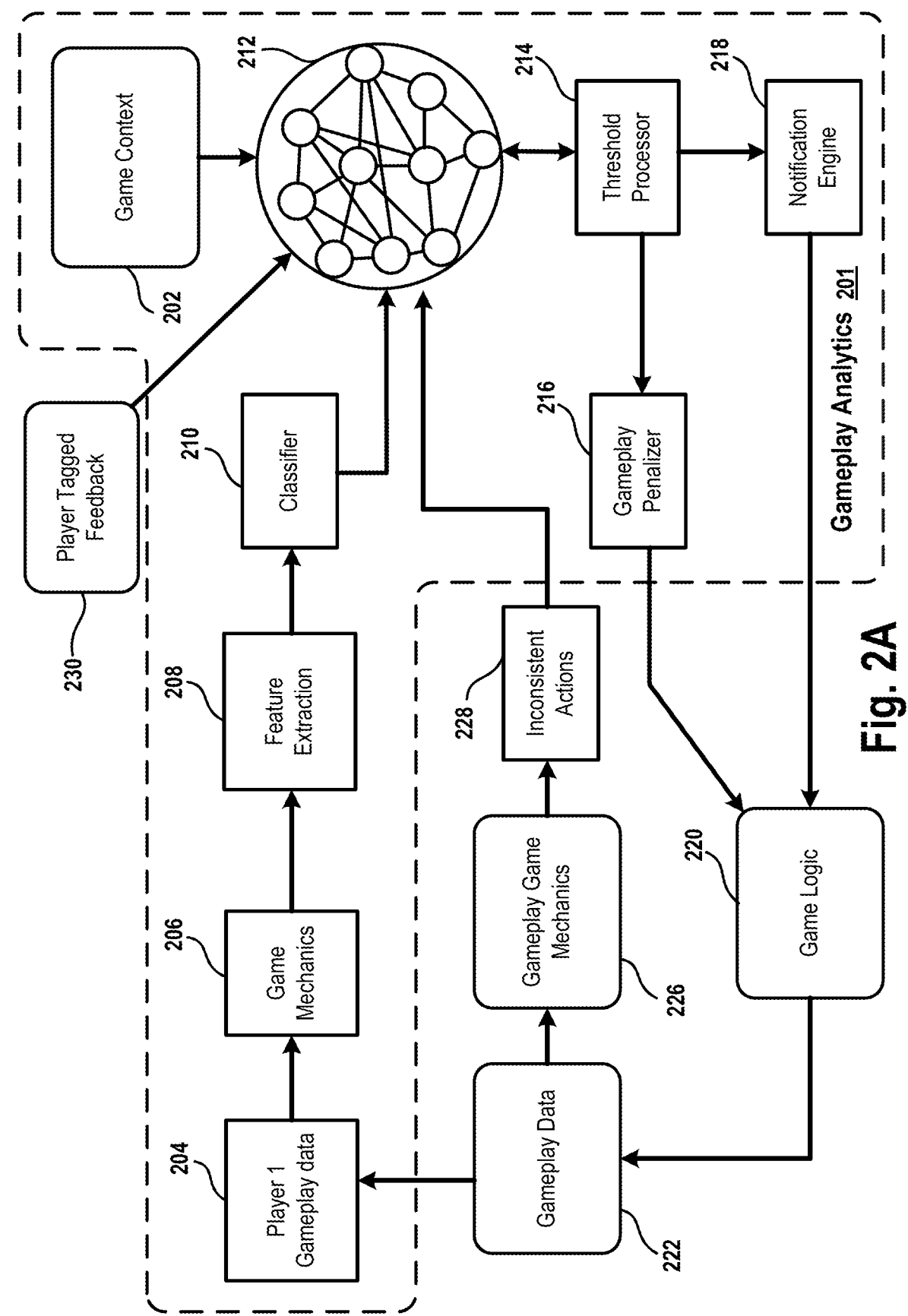
FIG. 2A illustrates an embodiment of a gameplay analytics engine receiving gameplay data from a game played by a player and processing the gameplay data to determine whether the actions of the player associated with the game mechanics are characterized as abusive, in accordance with an implementation of the disclosure.

FIG. 2A illustrates an embodiment of a gameplay analytics engine 201 receiving gameplay data 222 from a game played by a player 102 and processing the gameplay data 222 to determine whether the actions of the player associated with the game mechanics 206 (e.g., points scored, prisoner rescued, enemies attacked) are characterized as abusive. As shown in FIG. 2, the system includes the gameplay analytics engine 201 that is configured to receive gameplay data 222 as a game is being played by the players 102. In one embodiment, the gameplay analytics engine 201 may include an operation for extracting player gameplay data 204 and an operation for processing game mechanics data 206 from the gameplay data 222. After processing the game mechanics data 206, the gameplay analytics engine 201 may include a feature extraction 208 operation that is configured to receive the game mechanics data 206 to identify various features in the game mechanics. After the feature extraction 208 identifies the features associated with the game mechanics, a classifier 210 operation may be configured to classify the features using one or more classifiers.

In some embodiments, the gameplay analytics engine 201 includes an abuse indicator model 212 that is configured to receive the classified features from the classifier 210, data from the game context 202, inconsistent actions 228, and player tagged feedback 230. Using the classified features, the game context data, the inconsistent actions, and the player tagged feedback as inputs, the abuse indicator model 212 can be used to determine whether the actions of the player 102 in the game are characterized as abusive actions. A threshold processor 214 operation can use the abuse indicator model 212 determine whether the actions of the player 102 in the gameplay exceeds a specified threshold value. The output of the threshold processor 214 can be received by a gameplay penalizer 216 operation and a notification engine 218 operation as an input. In one embodiment, using data from the gameplay penalizer 216 operation and the notification engine 218, a game logic 220 operation can be used make changes to the game code to change various operational features associated with the gameplay.

In one embodiment, the system can process gameplay data 222 and extract data for a particular player (e.g., Player 1) to analyze the player's gameplay data. In one embodiment, the gameplay data 222 may include game telemetry data and gameplay metadata associated with each player 102 playing the game. The gameplay metadata may include coded information, such as state data that identifies all of the actions, inputs, and moves made by the player 102 during player's 102 gameplay session.

In some embodiments, the system can be configured to process and identify the game mechanics 206 associated with the gameplay of the player 102. In one embodiment, the game mechanics are the basic actions, processes, rules, and control mechanisms that make up gameplay for a video game. For example, the game mechanics for a game may include various actions such as jumping, leaping over obstacles, fighting enemies, defending against enemies, solving puzzles, managing resources. For each game, the game mechanics may vary and be based on the particular action scene that the player is playing. The system may include an operation that can process and identify the game mechanics 206 and actions being performed by the player 102 during the gameplay of the player. For example, a player 102 may be playing a fighting game and the operation can process and identify various game mechanics 206 associated with the game such as scoring points, attacking enemies, supporting teammates, etc.

In some embodiments, the feature extraction 208 operation is configured to process the game mechanics 206 data to identify and extract features associated with the game mechanics 206 performed by the player 102 during the gameplay. By way of example, these features may include what the player is doing in the gameplay such as how the player scored points (e.g., enemies killed, kill assist, flags captured, etc.), how the player attacked their enemies (e.g. sword, knife, rifle, grenade, etc.), how the player support teammates (e.g., helping teammate defend against enemy attacks, acquiring new weapons for team, supplying teammates with ammunition etc.).

After the feature extraction 208 operation processes and identifies the features from the game mechanics, the classifier 210 is configured to classify the features using one or more classifiers. In one embodiment, the features are labeled using a classification algorithm for further refining by the abuse indicator model 212. For example, during a game session, the player 102 may be in a battle scene fighting enemy soldiers. The features associated gameplay may include the player missing multiple targets when shooting at enemy soldiers, the player using a knife in combat to fight rather than using a gun, the player not defending themself when being attacked by enemy soldiers, the player not aiding teammates when the teammates are in need of help, etc. These noted features can be classified by the classifier 210 as being abusive acts (e.g., failing intentionally, misuse of game tools or game objectives, etc.).

In some embodiments, the abuse indicator model 212 can be configured to receive as inputs the classified features from the classifier 210, the game context 202, the inconsistent actions 228 associated with gameplay game mechanics 226, and the player tagged feedback 230. In another embodiment, other inputs that are not direct inputs or lack of input/feedback, may also be taken as inputs to the abuse indicator model 212. The abuse indicator model 212 may use a machine learning model to predict whether the actions of the player 102 are characterized as abusive and to determine an abusive action score associated with the game mechanics in the gameplay.

In some embodiments, the game context 202 may be used as an input for the abuse indicator model 212 so that the model knows what is going on in the game. The game context 202 may include data associated the context of the game, characters in the gameplay, current state of the gameplay, and the upcoming scenes. In one embodiment, the gameplay game mechanics 226 may include all of the game mechanics associated with the game that the player 102 is playing. Each of the gameplay game mechanics 226 may include a plurality of inconsistent actions 228 that are predefined to be inconsistent with how the game is intended to be played. For example, the inconsistent actions 228 may include various actions that are contrary with the intent of the gaming activity and tends to irritate or harass other players in the game.

In some embodiments, the player tagged feedback 230 may include feedback provided by other players during the gameplay. The player tagged feedback 230 can include various actions committed by the player during the gameplay that the other players in the game identify as being inconsistent actions. For example, a player may be playing a basketball game and only shoots the ball from half-court and never defends an opposing player when on defense. These actions by the player can be tagged by the player's teammates as inconsistent actions since it is contrary with the intent of the game (e.g., scoring points, playing defense). Accordingly, the player tagged feedback 230 can be used as an input for the abuse indicator model 212 so that the model understands and learns what actions can be characterized as abusive.

In some embodiments, the threshold processor 214 operation can use the abuse indicator model 212 to determine whether the game mechanics associated with the gameplay of the player 102 exceeds a specified threshold value. In one embodiment, the threshold value may be determined by a developer and vary on the specific type of game mechanic. Using the abusive action score obtained from the abuse indicator model 212, the threshold processor 214 operation can determine whether the abusive action score for a specific game mechanic exceeds the corresponding threshold value. For example, the gameplay of a player 102 includes the game mechanic involving a player attacking enemy soldiers. The abuse indicator model 212 can be used to determine that the abusive action score for the game mechanic is 2.2. Since the threshold value for the game mechanic is 2.0, the abusive action score exceeds the threshold value and the player can be identified as an abusive player. Accordingly, appropriate remedial measures may be taken by the notification engine 218 and the gameplay penalizer 216 operation.

In some embodiments, when a player is identified as an abusive player (e.g., abusive score exceeds threshold value), the notification engine 218 can be configured to generate a warning notification 108 to notify the player that the player has been identified as an abusive player. In some embodiments, the warning notification 108 may request the abusive player to comply with a specific request (e.g., don't spam chat channel) In some embodiments, when a player is identified as an abusive player, the gameplay penalizer 216 operation can be configured to limit various game mechanics associated with the gameplay of the player (e.g., limiting frequency of emoticon use, limiting frequency of chat use, limiting frequency of weapon use, etc.) or to disable the game mechanics so that the player is unable to use it anymore. For example, a player may be identified as an abusive player for overusing their weapon irrespective of having visible targets (e.g., weapon spamming) In this example, the context of game play is used as an input to determine whether the action may be abusive. Accordingly, the gameplay penalizer 216 can limit the player's usage of their weapon when the player attempts to waste their ammunition by shooting at non-targets.

In some embodiments, the game logic 220 operation can receive as input data from the notification engine 218 and the gameplay penalizer 216 operation. Using the data, the game logic 220 operation can be used make changes to the game code so that a warning notification 108 appears within the gameplay of the player or to limit the game mechanics of the player to prevent the player from acting abusively in the gameplay.

Figure 2B:
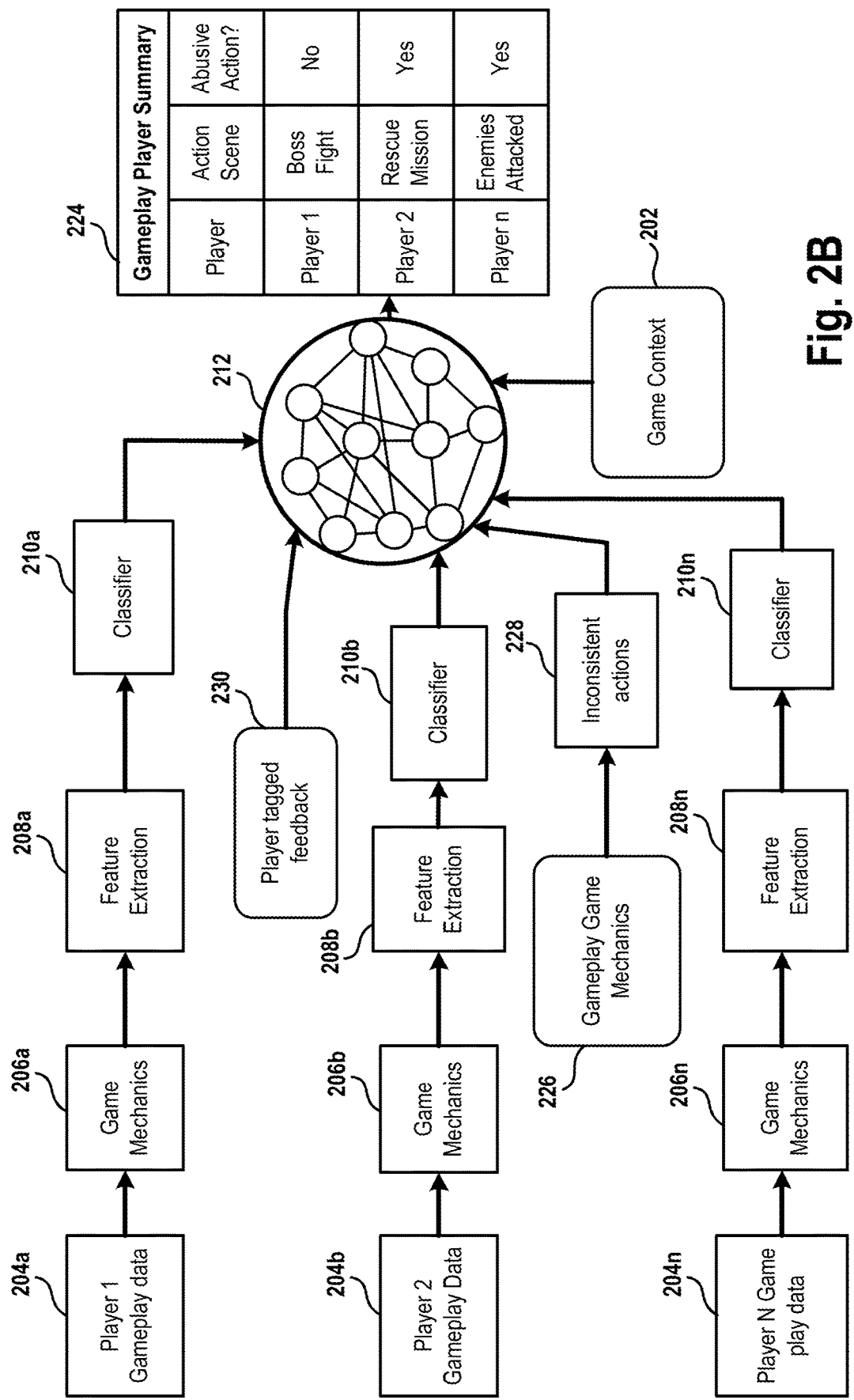
FIG. 2B illustrates an embodiment of a method for using an abuse indicator model to generate a gameplay player summary table using game context, gameplay data from a plurality of players, inconsistent actions, and player tagged feedback as inputs, in accordance with an implementation of the disclosure.

FIG. 2B illustrates an embodiment of a method for using an abuse indicator model 212 to generate a gameplay player summary table 224 using game context 202 gameplay data 204a-204n from a plurality of players, inconsistent actions 228, and player tagged feedback 230 as inputs. In one embodiment, the abuse indicator model 212 implements one or more machine learning operations that ingest the player gameplay data 204a-204n, the game context 202, the inconsistent actions 228, and the player tagged feedback 230. In one example, the method includes accessing player gameplay data 204a-204n from a game that is being played by players 102 (e.g., Player 1, Player 2, Player N). In one embodiment, the player gameplay data 204a-204n may include gameplay metadata associated with each corresponding player in the game. The gameplay metadata may include coded information, such as state data that identifies all of the actions, inputs, and moves made by the players 102 during the gameplay.

In another embodiment, the method may further include parsing the gameplay data 204a-204n of each player to extract and identify the game mechanics 206a-206n associated with the gameplay of the players. As noted above, the game mechanics are the basic actions, processes, rules, and control mechanisms that make up the gameplay for a video game. For example, the game mechanic in a game can include various mechanisms such as scoring points, jumping, maneuvering over obstacles, fighting enemies, defending against enemies, solving puzzles, managing resources, etc.

In another embodiment, the method may further include feature extraction 208a-208n operations that are configured to receive the game mechanics data 206a-206n to identify various features in the game mechanics. After the feature extraction 208a-208n operation identifies the features associated with the game mechanics 206a-206n in the gameplay, a classifier 210a-210n can be configured to classify the features using one or more classifiers.

In some embodiments, the method flows to the abuse indicator model 212 which is configured to receive as inputs the game context 202 so that the model knows what is occurring in the game, the classified features from classifier 210a-210n, the inconsistent actions 228, and the player tagged feedback 230. In another embodiment, other inputs that are not direct inputs or lack of input/feedback, may also be taken as inputs to the abuse indicator model 212. For example, a player's accolades and other data associated with the player can be taken as inputs to the abuse indicator model 212. The abuse indicator model 212 may use a machine learning that is used to predict whether the player's actions in the gameplay are abusive or consistent with the intent of the gameplay. The abuse indicator model 212 may also identify patterns and similarities based on the noted inputs. Using the patterns and similarities, the abuse indicator model 212 may infer whether a specific action of a player is characterized as abusive.

As noted above, the each of the gameplay game mechanics 226 may include a plurality of inconsistent actions 228 that are predefined to be inconsistent with how the game is intended to be played. Inconsistent actions may be programmed or coded into a database, which can be used to determine if such action is inconsistent with a game mechanic for specific contextual scenarios. In other embodiments, the player tagged feedback 230 may include feedback provided by other players during the gameplay. The player tagged feedback 230 can include various actions committed by the player during the gameplay that the other players in the game identify as inconsistent actions. For example, an action scene includes a "Boss Fight" where the objective of the players is to shoot the villain character. Using the classified features from classifier 210a-210n, the game context 202, the inconsistent actions 228, and the player tagged feedback 230, the abuse indicator model 212 is used to determine that the shooting accuracy rate for player 1, player 2, and player N, is 95.4%, 93.1%, and 13.5%, respectively. Since the shooting accuracy rate for player N is significantly lower than the shooting accuracy rate for player 1 and player 2, it can be inferred that player N acted abusively during the "Boss Fight" action scene.

In some embodiments, the method then flows to the gameplay player summary table 224 where the output of the abuse indicator model 212 can be information used for rendering the gameplay player summary table 224. In some embodiments, the gameplay player summary table 224 may include information related to the gameplay of the players 102, performance metrics in various action scenes, actions scenes where the player is identified as abusive, etc.

Figure 3:
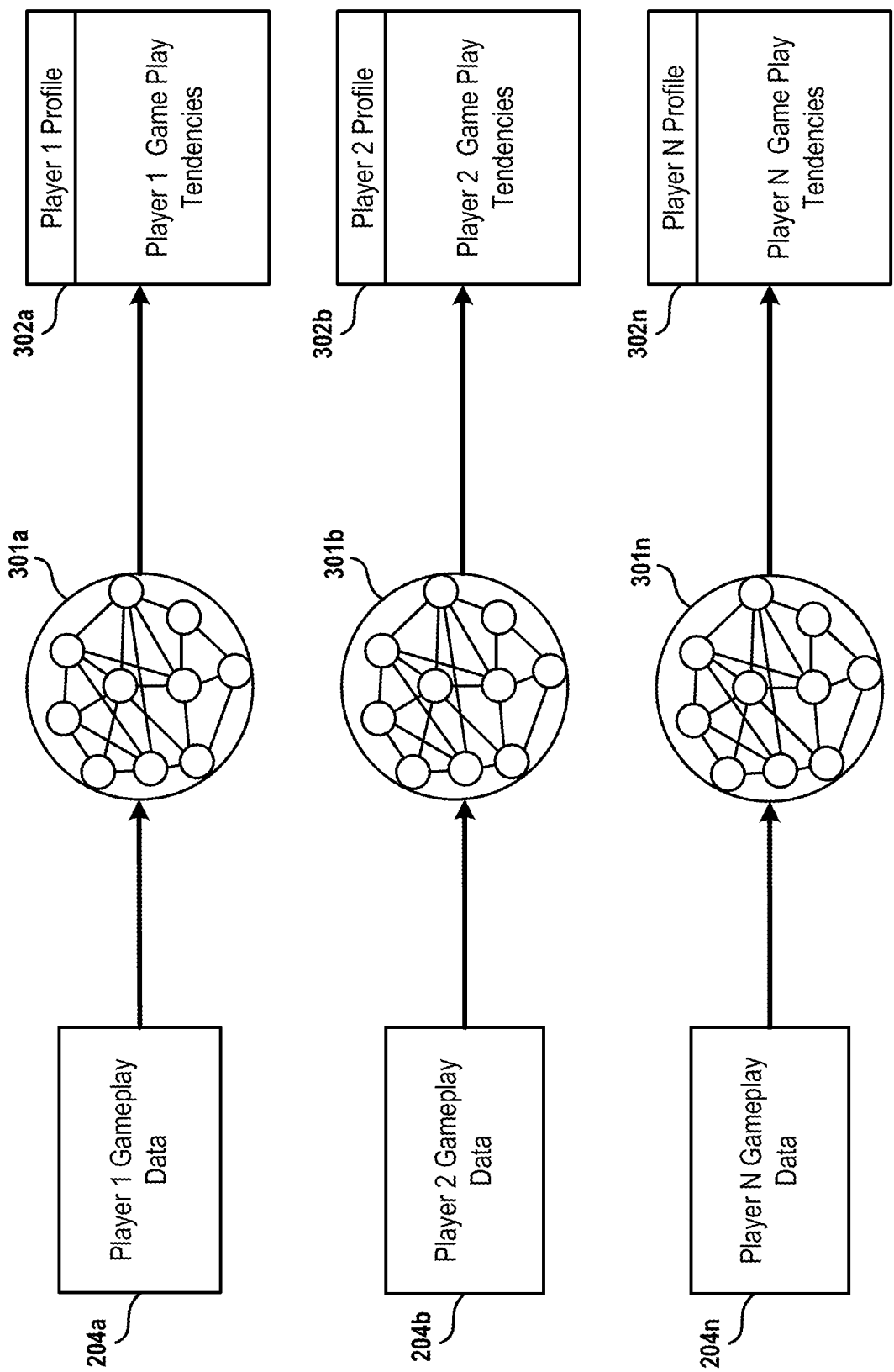
FIG. 3 illustrates an embodiment of a system generating a player profile for a given player using player gameplay data and a player profile model, in accordance with an implementation of the disclosure.

FIG. 3 illustrates an embodiment of a system generating a player profile 302a-302n for a given player using player gameplay data 204a-204n and a player profile model 301a-301n. In one embodiment, the player profile model 301a-301n implements one or more machine learning operations that ingest the player gameplay data 204a-204n. The player gameplay data 204a-204n may include gameplay metadata and a variety of information associated with all the games that the player has played in the past. For example, the player gameplay data 204a-204n may include information such as the type of games played, total time played, total wins and losses, actions performed by the players, points scored, goals earned, interactions between the players, progression in the game, etc. In one embodiment, the player profile model 301a-301n is configured to process metadata produced by the game, which can be parsed to identify specific features that relate to the actions of the player 102.

In some embodiments, the player profile model 301a-301n can be used to generate a player profile 302a-302n for a particular player and to predict various gameplay tendencies of the player. In one embodiment, the player profile model 301a-301n can process the above noted input to identify features associated with the video games played by the player in order to classify the features, using one or more classifiers. The classified features are then used by a machine learning engine to predict a player's gameplay tendencies for various types of video games. The output of the player profile model 301a-301n can be information used for creating a player profile 302a-302n for a given player. The player profile 302a-302n may include attributes and characteristics of the player such as gaming experience, gameplay history, viewing history, gaming skill level, preferences, interests, disinterests, etc. In some embodiments, the player profile 302a-302n may include information related to the player's tendencies and habits during gameplay, e.g., chat spamming, failing a team objective intentionally, misusing a weapon, etc.

In one embodiment, knowing a player's abusive tendencies can allow the system to proactively take action before the abusive act occurs, e.g., limit the game mechanics of the player's gameplay or warn the player in advance. For example, the player profile 302a-302n of a player indicates that the player tends to intentionally interfere with the gameplay of teammates when playing a sports game. When the player plays a soccer game, the system may generate a warning notification at the start of the gameplay to remind the player to not interfere with the gameplay of the teammates, e.g., do not trip teammates or steal the soccer ball from a teammate. In some embodiments, instead of generating a warning notification to notify the player, the game mechanics of the player can be limited. For example, the player's ability to trip a teammate or to steal the soccer ball from a teammate can be applied.

FIG. 4A illustrates an embodiment of a game mechanics grid 402 for a game played by a player 102. In one embodiment, the game mechanics grid 402 can include a list of game mechanics 206 associated with the game played by the player, a description 406 associated with the corresponding game mechanic 206, various types of abusive actions 408 that can be committed by the player, an abusive action score 410 that is calculated based on the abusive actions committed by the player, a threshold value 412 associated with the game mechanic, and an evaluation of whether the abusive action score 410 exceeds the threshold value 412 (e.g., 414).

As noted above, the game mechanics are the basic actions, processes, rules, and control mechanisms that make up gameplay for a video game. As illustrated in FIG. 4A, for a particular game, the game mechanics 206 may include various mechanics such as points scored, prisoner rescued, obstacle course completion, relay race, enemies attacked, damaged acquired, etc. The game mechanics 206 may vary and depend on the game being played by the player. For each game mechanic 206, the system may keep track of the plurality of abusive actions 408 that a player 102 may commit during the gameplay. For example, as illustrated on the game mechanics grid 402, the abusive actions 408 include a total of five categories. These categories include failing intentionally (e.g., hitting a volleyball out of bounds), misuse of a game mechanic (e.g., using a flash grenade on a teammate), overuse of a game mechanic (e.g., wasting ammunition), spamming (e.g., flooding game chat system with emoticons), and complaints (e.g., received by teammates). In general, the abusive actions are actions that are inconsistent with the intent of the gaming activity and are intended to irritate or harass other players within the game. In some embodiments, during the gameplay of the player, the system keeps track of the player's action during the gameplay and automatically tags an action as abusive when the player commits an abusive action. In one embodiment, other players in the game can tag an action of the player as abusive when the player commits an abusive action.

As illustrated in FIG. 4A, game mechanic GM-7 involves the player's defense against enemies. As illustrated on the game mechanics grid 402, the player failed intentionally a total of 4 times (e.g., did not defend against enemy attacks) and overused a game mechanic in the game a total of 2 times (e.g., wasted weapon ammunition). Accordingly, an abusive action score for game mechanic GM-7 can be determined by taking the summation of the total abusive actions (e.g., $\Sigma(4+2)=6$) and dividing it by the total number of abusive action categories (e.g., 5). As a result, the abusive action score for GM-7 results in a value of 1.2, e.g., $\Sigma(4+2)/(5)=1.2$.

As noted above, the threshold value 412 associated with the game mechanic can be compared to the abusive action score 410 to evaluate whether the abusive action score 410 exceeds the threshold value 412. For example, game mechanic GM-7 has a threshold value of 0.75 and the abusive action score for GM-7 resulted in a calculated value of 1.2. Since the abusive action score exceeds the threshold value, the player 102 can be identified as an abusive player and appropriate measures can be taken to prevent the abusive player from committing actions that are characterized as abusive (e.g., limiting game mechanics, warning player, etc.).

In some embodiments, the game mechanics grid 402 can be used by a developer to track and monitor the abusive actions committed by the player 102 during the gameplay of the player. The game mechanics grid 402 can be an efficient tool in helping developers identify possible abusive players because the game mechanics grid 402 can track various abusive acts of a player which can minimize the amount of data that a developer may have to sort through. In one embodiment, a developer may proactively decide to take disciplinary action (e.g., warning the player, limiting game mechanics of the player, etc.) before the abusive action score 410 exceeds the corresponding threshold value 412. In some embodiments, the game mechanics grid 402 can be used by developers to determine whether a player is a good faith player and acts in accordance with the rules and guidelines of the game. For example, after the end of a game session, a player with an abusive action score 410 that is significantly lower than the threshold value 412 may be identified as good faith player. Accordingly, the game mechanics grid 402 can be used to distinguish between abusive players and good faith players.

In some embodiments, the game mechanics grid 402 can be used by a developer to identify trends and patterns associated with a particular game mechanic. For example, for a particular game mechanic that involves shooting a moving target, the game mechanics grid 402 may indicate that the majority of the players in the game intentionally failed to shoot at the target. However, this may be false because the moving target may be moving too fast and it may be difficult for most players to successfully hit the target. Accordingly, a developer may investigate this particular game mechanic associated with the game and determine whether changes need to be made so that it does not appear that the players are intentionally failing to shoot at the target (e.g., increasing the threshold value, adjusting game code to make it easier hit the moving target, etc.).

Figure 4B:
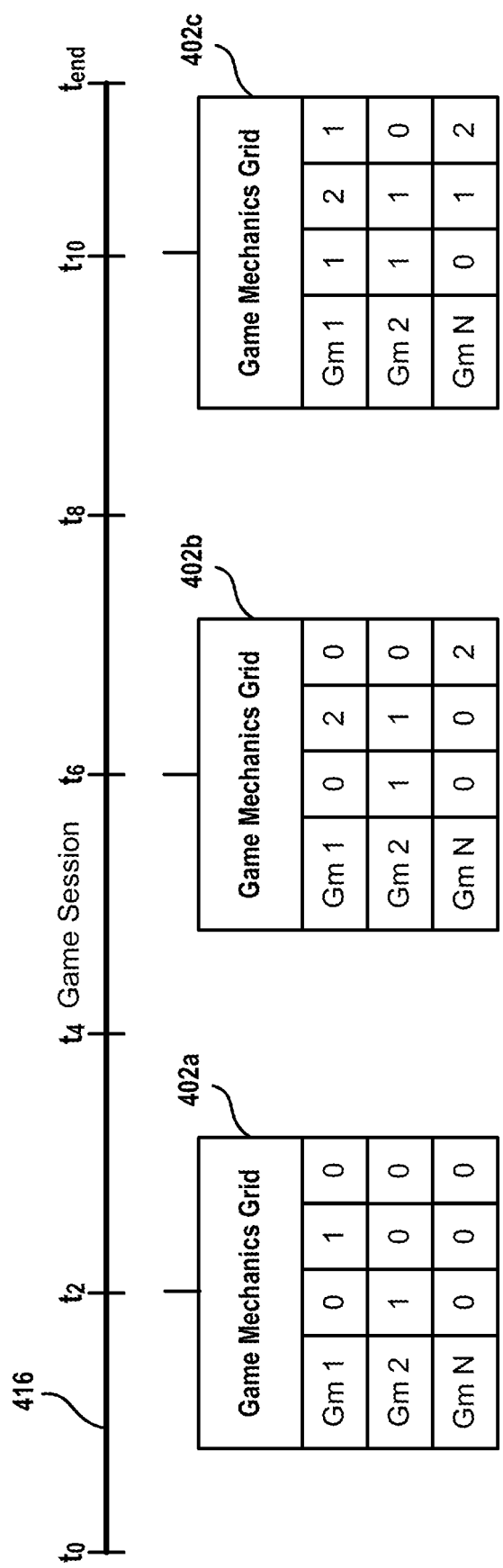
FIG. 4B is an embodiment illustrating a timeline with a game mechanics grid being continuously updated throughout a game session, in accordance with an implementation of the disclosure.

FIG. 4B is an embodiment illustrating a timeline 416 with a game mechanics grid 402 being continuously updated throughout a game session. In one embodiment, during a game session of the player 102, the game mechanics grid 402 is generated for the player 102 when the game session begins (e.g., time t0) and is continuously updated throughout the game session until the game session ends (e.g., time tend). For example, as illustrated in FIG. 4B, at time t2, the game mechanics grid 402a can be accessed to determine whether the player is committing any abusive actions during the gameplay and to determine whether the threshold value associated with the game mechanics has been exceeded. As the gameplay of the player 102 progresses, the game mechanics grid may continue to change and may vary at any point in time. Accordingly, as shown in FIG. 4B, the game mechanics grid 402b and 402c can be accessed at time t6 and t10, respectively, to determine whether there are any changes to the game mechanics grid. In one embodiment, the game mechanics grid may reset after each game session ends, after an action scene ends, or after a level is completed. In some embodiments, the game mechanics grid does not reset and is continuous for the entire gameplay of the player.

Figure 5:
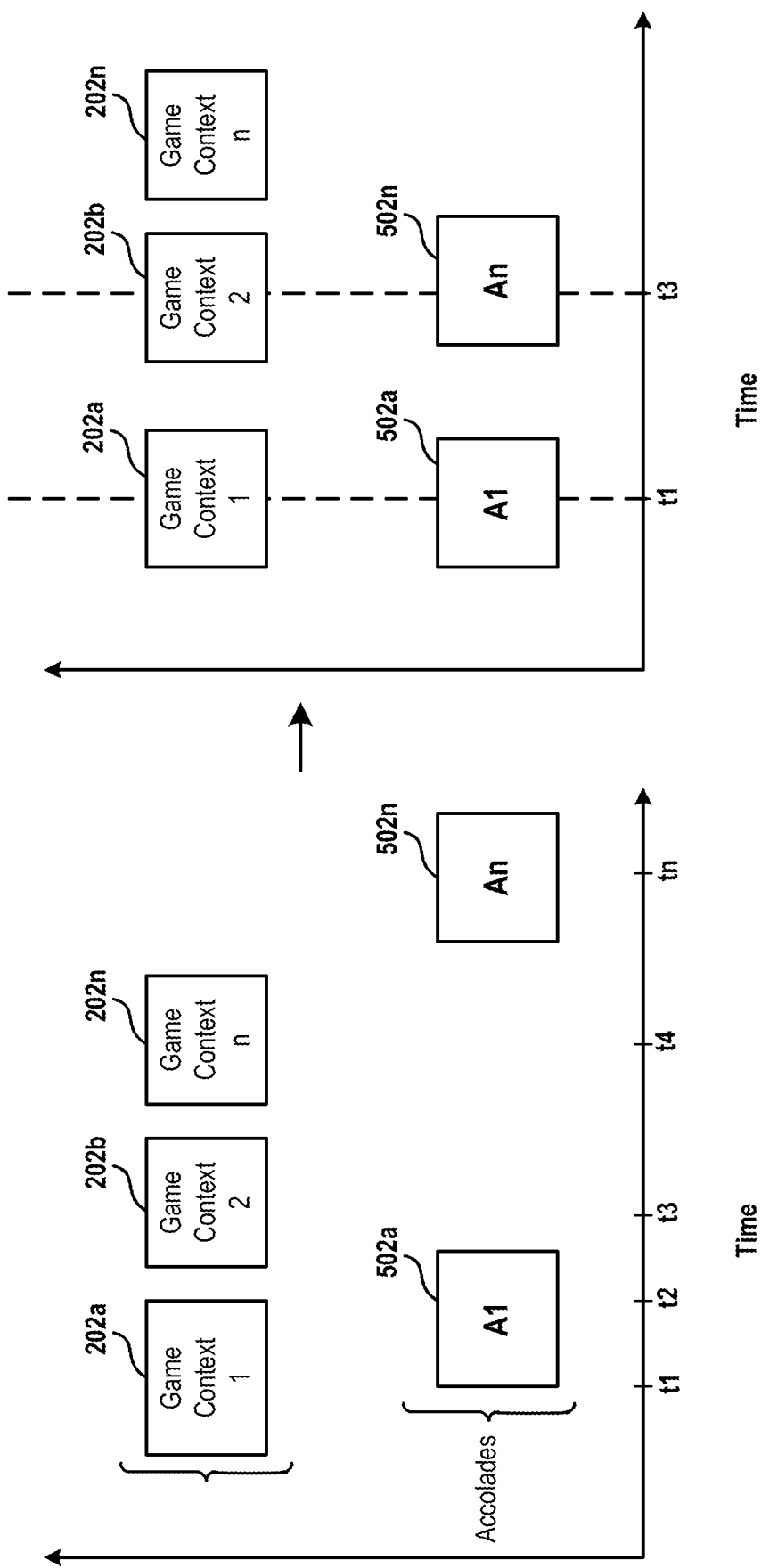
FIG. 5 is an embodiment illustrating correlating accolades that are presented to a player during a game to a specific game context in the game, in accordance with an implementation of the disclosure.

FIG. 5 is an embodiment illustrating correlating accolades that are presented to a player 102 during a game to a specific game context in the game. In some embodiments, accolades may be given to a player 102 during a gameplay session of the player or after a game session ends. The accolades may be given to a player 102 by teammates of the player or by players on the opposing team. As shown in FIG. 5, accolades 502a-502n are unaligned with game context 202a-202n because the accolades are given at a point in time after the game context occurs. Because of the misalignment, this may cause inaccuracies when determining which game context the accolades are associated with.

For example, during the gameplay of the player involving a motocross race, the player may perform a series of actions. As illustrated in FIG. 5, game context 202a represents a state in the game when the player jumps off a ramp, game context 202b represents a state in the game when the player takes the lead in the race, and game context 202n represents a state in the game when the player crashes and looses the lead in the race. Accordingly, the system may be configured to correlate the accolades with the appropriate game context. As a result, as shown in FIG. 5, accolade 502a is aligned to correspond to game context 202a (e.g., player jumping off a ramp) and accolade 502n is aligned to correspond to the game context 202b (e.g., player taking the lead in the race). In one embodiment, correlating the accolades and the game context can be performed by a machine learning model that has been trained to know the relative delays between the two datasets or based on the context of the gameplay.

FIG. 6 illustrates an embodiment of a player accolades table 602 for a plurality of players 102. In one embodiment, the player accolades table 602 can include a list of players 102 that participated in the gameplay, an action scene 606 associated with the gameplay, accolades given 608 to a player, an average accolade score 610, and an evaluation of whether the player's performance is characterized as abusive (e.g., 612). As illustrated, the gameplay associated with players 102a-102n may include various action scenes such as boss fight, ninja fight in the field, rescue mission, battling Poseidon, climbing latter, etc. As noted above, in some embodiments, accolades may be given to a player during the gameplay or after a game session ends. In one embodiment, the accolades may be given by a player playing the game or a viewer watching the game. In one embodiment, as shown in FIG. 6, positive accolades (e.g., arrow pointed up) and negative accolades (e.g., arrow pointed down) can be given to a player, and a maximum of five positive or negative accolades can be awarded to a given player.

For example, as illustrated in FIG. 6, player 1 is given a total of three positive accolades for the boss fight action scene, one positive accolade for the ninja fight action scene, five positive accolades for the rescue mission action scene, two positive accolades for the battling Poseidon action scene, and four negative accolades for the climbing ladder action scene. In some embodiments, the average accolade score 610 corresponding to an action scene in the gameplay can be calculated for the player. The average accolade score 610 is an average of all the accolades given to a player for a specific action scene. For example, the average accolades score 610 corresponding to the rescue mission action scene for player 1 results in a value of 4.5. In another example, the average accolades score 610 corresponding to the climbing ladder action scene results in a value of −3.5. In one embodiment, when calculating the average accolades score 610, negative accolades are represented by negative values (e.g., three negative accolades=−3) which can result in a negative accolades score.

In some embodiments, the average accolades score 610 can be used to evaluate whether the player's performance in a specific action scene is characterized as abusive, e.g., 612. In one embodiment, the average accolades score 610 can be compared to a specified threshold value to determine whether the gameplay performance of the player is characterized as abusive. In one example, as illustrated in FIG. 6, an average accolade score that is less than zero is considered abusive, and an average accolade score that greater than zero is not considered abusive. Accordingly, a player's average accolades score 610 can be used to help determine whether a player is an abusive player.

In some embodiments, the accuracy and credibility of a player's average accolades score can be determined based on the players who are awarding the accolades. For example, if a player has a high average accolades score (e.g., 4.9/5) and the accolades were awarded by abusive players, it can be inferred that the player's average accolades score may be false or inaccurate. Accordingly, developers may investigate the accolades awarded to the player by the abusive player to determine whether the actions of the player are consistent with acts that are characterized as receiving positive accolades.

Figure 7:
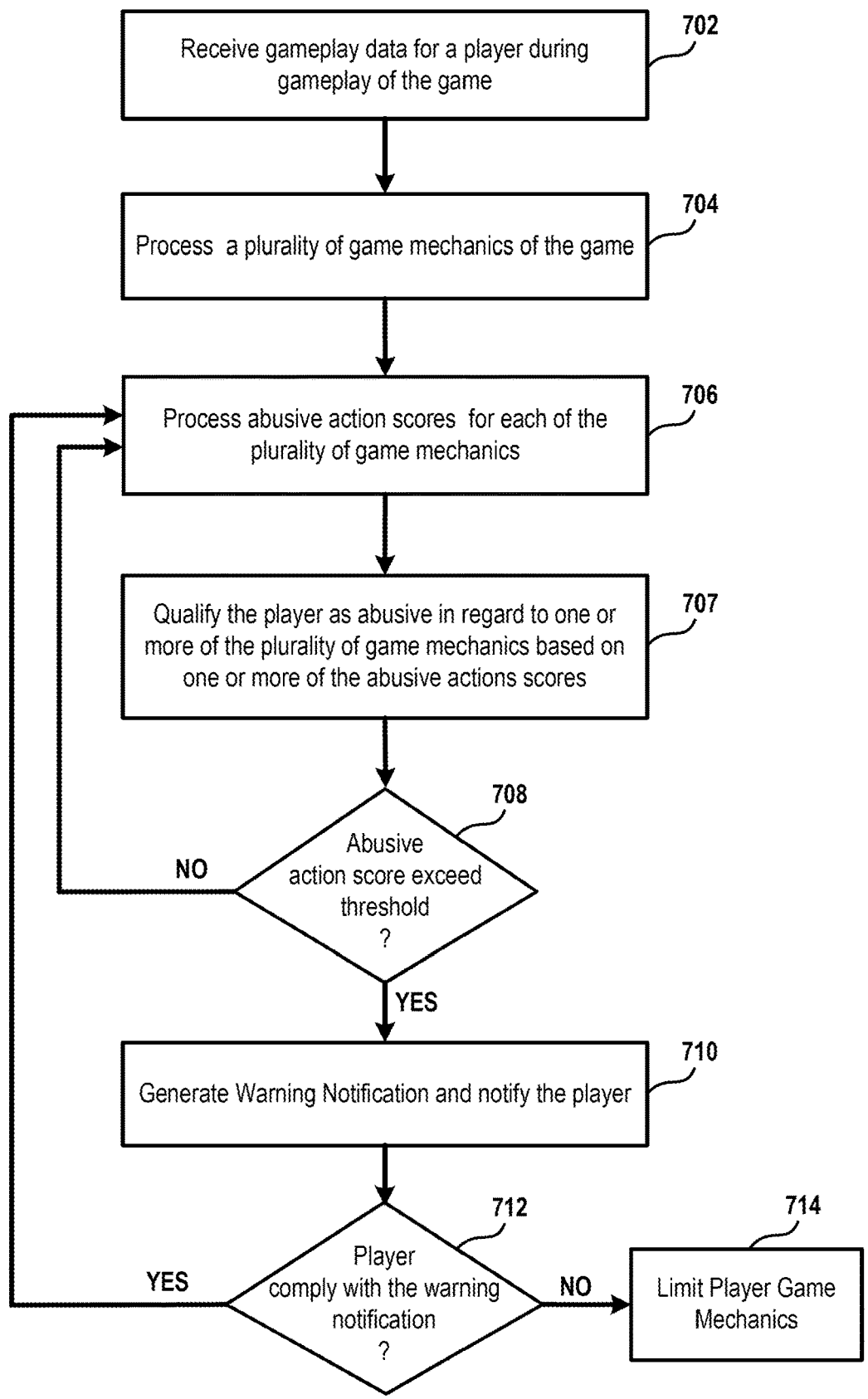
FIG. 7 illustrates a method for identifying an abusive player in a game during a game session, in accordance with an implementation of the disclosure.

FIG. 7 illustrates a method for identifying an abusive player in a game during a game session. In one embodiment, the method includes an operation 702 that receives gameplay data for a game played by the player 102. The method flows to operation 704 where the operation is configured to process a plurality of game mechanics of the game as the player provides input for one or more of the plurality of game mechanics. For example, the player may be playing a multiplayer game where the player is competing in a volleyball tournament. The method may identify and process various game mechanics associated with the gameplay such as scoring points, striking the ball over the net, preventing the ball from hitting the ground, etc. While the player is playing the volleyball game, the player is providing a plurality of input associated with the game mechanics of the game, e.g., passing the ball, spiking the ball, blocking the ball, serving the ball, etc.

The method flows to operation 706 where the operation is configured to process abusive action scores for each of the plurality of game mechanics. In some embodiments, the abusive action scores have a number of tagged actions that are inconsistent with predefined use of said plurality of game mechanics based a game context of the gameplay of the game. Generally, the tagged actions that are inconsistent with predefined use of the game mechanics are contrary with the intent of the gaming activity which tends to irritate or harass other players in the game. For example, as illustrated in FIG. 4A (e.g. abusive actions 408), actions that are inconsistent with the predefined use of game mechanics can include acts such as failing intentionally, misusing game mechanics, overusing game mechanics, spamming, complaining (e.g., receiving complaints or excessive complaining). As the gameplay progresses, when a player commits an act that is inconsistent with the predefined use of the game mechanics, the act is tagged to and used to process the abusive action scores. In other embodiments, additional examples of inconstant actions and abusive acts may include include kill stealing, purposefully violating rules or guidelines, exploiting bugs in the game, playing slow and ineffectively, deliberately performing actions detrimental to other team members' game performance, etc.

At operation 708, the operation is configured to determine whether the abusive action score exceeds the threshold value for any of the game mechanics of the game. For example, referring to the game mechanics grid 402 in FIG. 4A, various acts of abusive behavior (e.g., 408) are identified and tagged to determine the number of times a player 102 commits an abusive behavior for a corresponding game mechanic. For example, for game mechanic GM-N (e.g., weapons acquired), the player committed a total of 6 acts of abusive behavior. In particular, the player 102 failed intentionally a total of 2 times (e.g., did not acquire updated weapon when given the opportunity), spammed a total of 2 times (e.g., submitted excessive emoticons in chat channel), and received a total of 2 complaints from teammates. Accordingly, the abusive action score for mechanic GM-N resulted in a calculated value of 1.2 (e.g., $\Sigma(2+2+2)/(5)$ =1.2). Since the abusive action score exceeds the threshold value (e.g., 1.0), the player 102 can be identified as an abusive player. As a result, once the abusive player is identified, the method flows to operation 710. However, if the abusive action score does not exceed the corresponding threshold value, the method flows back to operation 706 where the operation is configured to continue processing the abusive actions scores for each of the game mechanics.

At operation 710, the operation is configured to generate a warning notification 108 and to notify the player 102 that the player is identified as an abusive player. In one embodiment, the warning notification 108 can appear on the monitor 106 of the player to notify the player. The warning notification 108 can include a message to put the abusive player on notice that the player has been identified as an abusive player. In some embodiments, the warning notification 108 may include specific instructions to request the abusive player to restrain from performing a specific abusive act, e.g., don't hit ball out of bounds, don't waste ammunition, don't shoot teammate, don't use excessive emoticons, etc. For example, referring to FIG. 1, player 102a is identified as an abusive player and the warning notification 108 appears on the monitor 106a which includes the message, "Warning! You are identified as an abusive player. Don't hit ball out of bounds."

The method flows to operation 712 where the operation is configured to determine whether the abusive player complied with the warning notification 108. If the abusive player is compliant with the request indicated in the warning notification 108, the method flows back to operation 706 where the operation is configured to continue processing the abusive actions scores for each of the game mechanics. However, if the abusive player ignores the request indicated in the warning notification 108 and continues to commit acts that are characterized as abusive, the method flows to operation 714.

At operation 714, the operation is configured to limit player game mechanics associated with the gameplay. In one embodiment, operation 714 can be configured to change the operation of the game for the abusive player by adjusting the game code to limit specific game mechanics in the gameplay of the player. In one embodiment, operation 714 can be configured to adjust the game code to prevent or limit the abusive player from performing various gameplay functionalities such as killing a teammate, hitting a ball out of bounds, spamming the chat channel with emoticons, etc.

Figure 8:
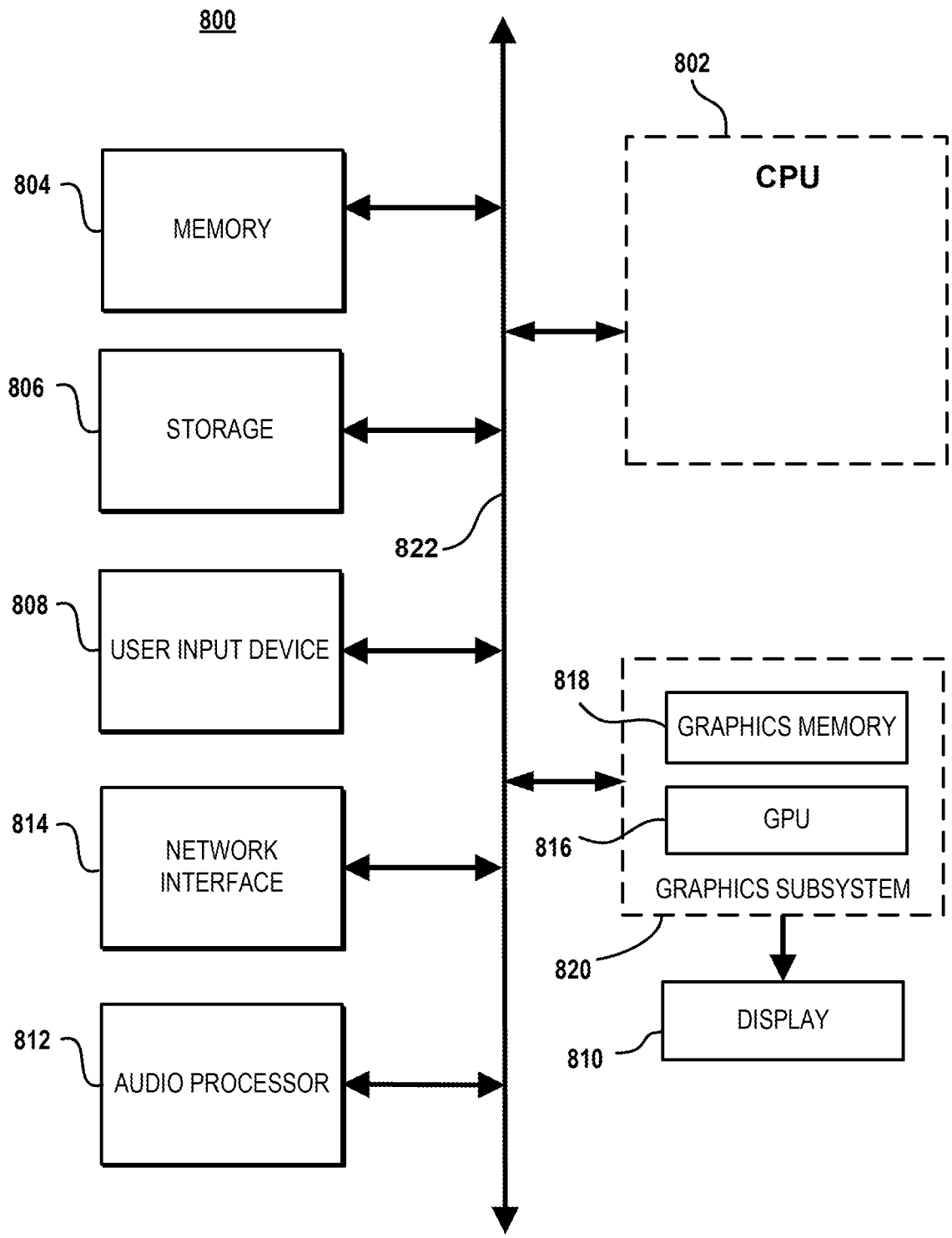
FIG. 8 illustrates components of an example device 800 that can be used to perform aspects of the various embodiments of the present disclosure.

FIG. 8 illustrates components of an example device 800 that can be used to perform aspects of the various embodiments of the present disclosure. This block diagram illustrates a device 800 that can incorporate or can be a personal computer, video game console, personal digital assistant, a server or other digital device, suitable for practicing an embodiment of the disclosure. Device 800 includes a central processing unit (CPU) 802 for running software applications and optionally an operating system. CPU 802 may be comprised of one or more homogeneous or heterogeneous processing cores. For example, CPU 802 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 800 may be a localized to a player playing a game segment (e.g., game console), or remote from the player (e.g., back-end server processor), or one of many servers using virtualization in a game cloud system for remote streaming of gameplay to clients.

Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to device 800, examples of which may include keyboards, mice, joysticks, touch pads, touch screens, still or video recorders/cameras, tracking devices for recognizing gestures, and/or microphones. Network interface 814 allows device 800 to communicate with other computer systems via an electronic communications network, and may include wired or wireless communication over local area networks and wide area networks such as the internet. An audio processor 812 is adapted to generate analog or digital audio output from instructions and/or data provided by the CPU 802, memory 804, and/or storage 806. The components of device 800, including CPU 802, memory 804, data storage 806, user input devices 808, network interface 810, and audio processor 812 are connected via one or more data buses 822.

A graphics subsystem 820 is further connected with data bus 822 and the components of the device 800. The graphics subsystem 820 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 808, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from graphics memory 818 to be displayed on display device 810. Display device 810 can be any device capable of displaying visual information in response to a signal from the device 800, including CRT, LCD, plasma, and OLED displays. Device 800 can provide the display device 810 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for identifying an abusive player in a game, comprising:
   receiving gameplay data for a player during gameplay of the game;
   processing a plurality of game mechanics of the game as the player provides input for one or more of said plurality of game mechanics;
   processing abusive action scores for each of the plurality of game mechanics, the abusive action scores have a number of tagged actions that are inconsistent with predefined use of said plurality of game mechanics based on a game context of the gameplay of the game;
   qualifying the player as abusive in regard to one or more of the plurality of game mechanics based on one or more of the abusive actions scores exceeding a threshold during a session of the gameplay of the game; and
   generating an interface for presenting the processed abusive action scores, the interface is configured to include the plurality of game mechanics and the tagged actions during the session of the gameplay, the interface being updated in substantial real time based on changes in the gameplay.

2. The method of claim 1, wherein the game is a multi-player game and the player is one of a plurality of players engaged in said gameplay during the session, wherein one or more of said tagged actions are received from other players when playing with the player in the multiplayer game.

3. The method of claim 1, wherein one or more of said tagged actions are automatically identified by an abuse indicator model that monitors use of game mechanics by the player based on said game context,
   wherein the abuse indicator model is configured to process as input a plurality of inconsistent actions for one or more of said plurality of game mechanics.

4. The method of claim 3, wherein said plurality of inconsistent actions include ones predefined as inconsistent or learned to be inconsistent based on feedback from one or more players tagging actions as inconsistent.

5. The method of claim 1, further comprising,
   generating a warning notification to notify the player that the player is qualified as an abusive player when the one or more of the abusive actions scores exceeds the threshold.

6. The method of claim 1, further comprising,
   adjusting game code of the game to limit the one or more of the plurality of game mechanics when the one or more of the abusive actions scores exceeds the threshold.

7. The method of claim 1, wherein the processing the abusive action scores is further based on processing features from the plurality of game mechanics and the game context of the gameplay, the features being classified and used to build an abuse indicator model that identifies relationships between the plurality of game mechanics and the game context.

8. The method of claim 1, wherein the qualifying the player as abusive is further based on processing by an abuse indicator model a profile of the player, the profile of the player identifying tendencies of the player in the gameplay and other games played by the player.

9. The method of claim 1, wherein the qualifying the player as abusive is further based on processing by an abuse indicator model accolades received by the player, said accolades are received from other players during the session of the gameplay or after the session of the gameplay ends.

10. The method of claim 9, further comprising,
correlating the accolades received by the player to a corresponding game context of the gameplay.

11. The method of claim 1, wherein the abusive action scores change over time during the session of the gameplay based on the number of tagged actions.

12. A non-transitory computer-readable storage medium storing a computer program, the computer-readable storage medium comprising:
program instructions for receiving gameplay data for a player during gameplay of the game;
program instructions for processing a plurality of game mechanics of the game as the player provides input for one or more of said plurality of game mechanics;
program instructions for processing abusive action scores for each of the plurality of game mechanics, the abusive action scores have a number of tagged actions that are inconsistent with predefined use of said plurality of game mechanics based on a game context of the gameplay of the game;
program instructions for qualifying the player as abusive in regard to one or more of the plurality of game mechanics based on one or more of the abusive actions scores exceeding a threshold during a session of the gameplay of the game, and
program instructions for generating an interface for presenting the processed abusive action scores, the interface is configured to include the plurality of game mechanics and the tagged actions during the session of the gameplay, the interface being updated in substantial real time based on changes in the gameplay.

13. The non-transitory computer-readable storage medium as recited in claim 12, wherein the game is a multiplayer game and the player is one of a plurality of players engaged in said gameplay during the session, wherein one or more of said tagged actions are received from other players when playing with the player in the multiplayer game.

14. The storage medium as recited in claim 12, wherein one or more of said tagged actions are automatically identified by an abuse indicator model that monitors use of game mechanics by the player based on said game context,
wherein the abuse indicator model is configured to process as input a plurality of inconsistent actions for one or more of said plurality of game mechanics.

15. The non-transitory computer-readable storage medium as recited in claim 12, wherein said plurality of inconsistent actions include ones predefined as inconsistent or learned to be inconsistent based on feedback from one or more players tagging actions as inconsistent.

16. The non-transitory computer-readable storage medium as recited in claim 12, further comprising, program instructions for generating a warning notification to notify the player that the player is qualified as an abusive player when the one or more of the abusive actions scores exceeds the threshold.

17. The non-transitory computer-readable storage medium as recited in claim 12, further comprising, program instructions for adjusting game code of the game to limit the one or more of the plurality of game mechanics when the one or more of the abusive actions scores exceeds the threshold.

18. The non-transitory computer-readable storage medium as recited in claim 12, wherein the qualifying the player as abusive is further based on processing by an abuse indicator model a profile of the player, the profile of the player identifying tendencies of the player in the gameplay and other games played by the player.

* * * * *